United States Patent
Huang et al.

(10) Patent No.: US 11,262,818 B2
(45) Date of Patent: Mar. 1, 2022

(54) PORTABLE ELECTRONIC DEVICE

(71) Applicant: Acer Incorporated, New Taipei (TW)

(72) Inventors: Yi-Ta Huang, New Taipei (TW);
Chun-Chieh Wang, New Taipei (TW);
Wu-Chen Lee, New Taipei (TW);
Cheng-Nan Ling, New Taipei (TW);
Cheng-Wen Hsieh, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/921,925

(22) Filed: Jul. 6, 2020

(65) Prior Publication Data
US 2021/0165473 A1   Jun. 3, 2021

(30) Foreign Application Priority Data
Dec. 3, 2019 (TW) .................... 108144126

(51) Int. Cl.
*G06F 1/16* (2006.01)
*G06F 1/20* (2006.01)
*G06F 1/26* (2006.01)

(52) U.S. Cl.
CPC ............ *G06F 1/203* (2013.01); *G06F 1/1656* (2013.01); *G06F 1/26* (2013.01)

(58) Field of Classification Search
CPC ...... G06F 1/1616; G06F 1/1656; G06F 1/166; G06F 1/203

USPC ......... 361/688, 690, 679.46, 679.48, 679.49, 361/679.51
See application file for complete search history.

(56) References Cited

U.S. PATENT DOCUMENTS

| | | | |
|---|---|---|---|
| 6,496,369 B2 * | 12/2002 | Nakamura ............ | G06F 1/1616 165/80.3 |
| 7,871,319 B2 * | 1/2011 | Tracy ...................... | G06F 1/203 454/184 |
| 2009/0273893 A1 * | 11/2009 | Wilson .................. | G06F 1/1667 361/679.12 |
| 2011/0075352 A1 * | 3/2011 | Tye ......................... | G06F 1/203 361/679.46 |
| 2018/0123268 A1 * | 5/2018 | Leigh .................. | H01R 12/7005 |
| 2018/0240733 A1 * | 8/2018 | Chen ...................... | G06F 1/206 |
| 2021/0011533 A1 * | 1/2021 | Escamilla ................ | G06F 1/20 |

* cited by examiner

*Primary Examiner* — Anthony Q Edwards
(74) *Attorney, Agent, or Firm* — JCIPRNET

(57) ABSTRACT

A portable electronic device including a body, a door, a carrier and at least one electronic module is provided. The door is movably mounted on the body. The carrier includes a first side and a second side opposite to each other, the first side is pivoted to the body, and the second side is movably pivoted to the door. The electronic module is disposed on the carrier. At least one opening is formed between the door and the body when the door moves away from the body, and the door drives the carrier to rotate relative to the body, such that the electronic module is tilted with respect to the body along with the movement of the door, and the electronic module is exposed to an external environment via the opening for heat dissipation.

13 Claims, 6 Drawing Sheets

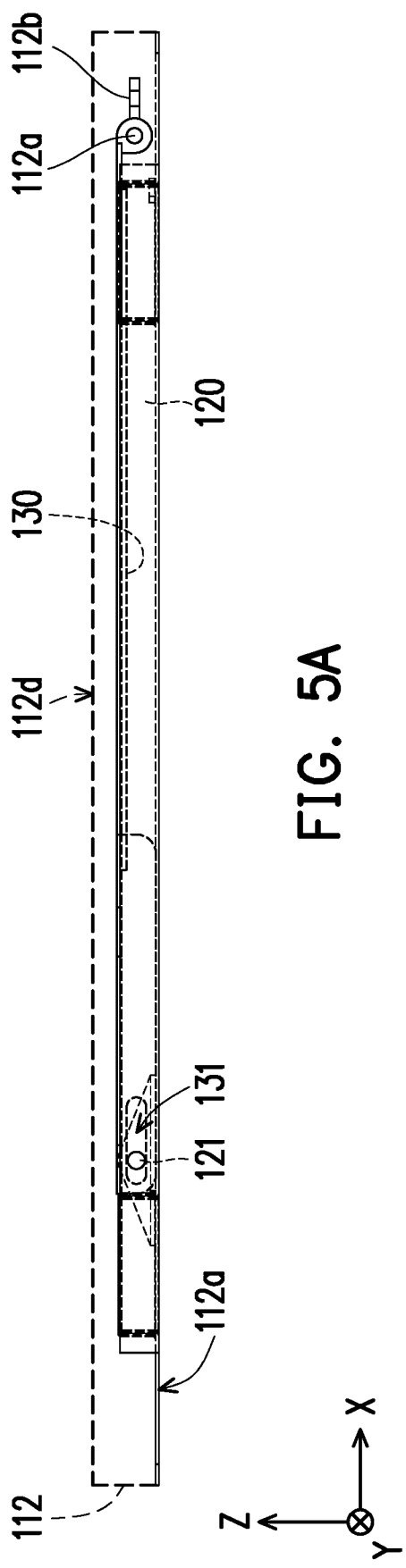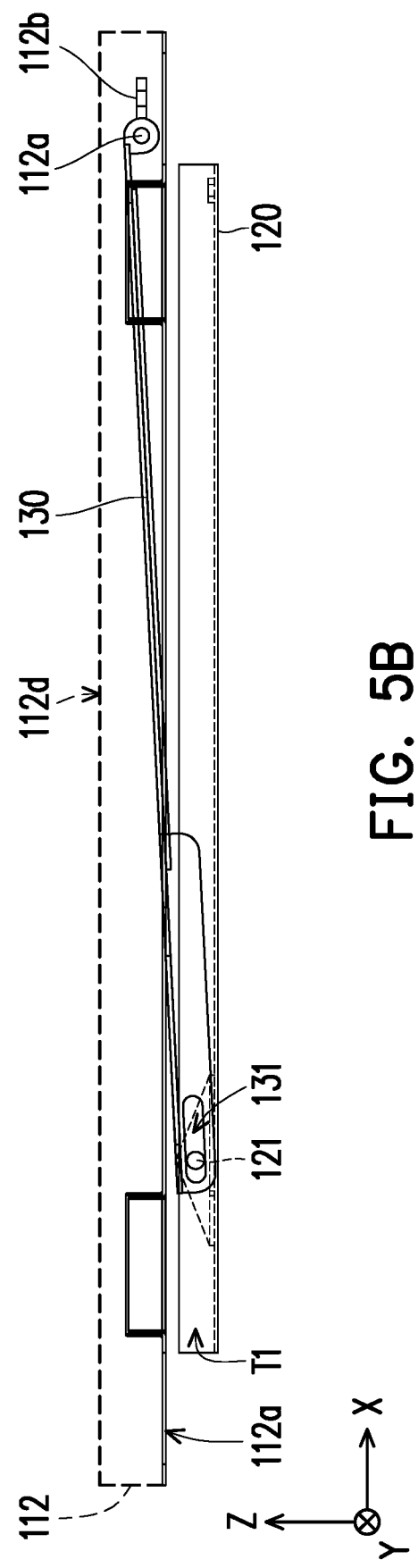

… (1)

PORTABLE ELECTRONIC DEVICE

CROSS-REFERENCE TO RELATED APPLICATION

This application claims the priority benefit of Taiwan application serial no. 108144126, filed on Dec. 3, 2019. The entirety of the above-mentioned patent application is hereby incorporated by reference herein and made a part of this specification.

BACKGROUND OF THE INVENTION

1. Field of the Invention

The invention relates to an electronic device, and in particular, to a portable electronic device in which an electronic module can be exposed to an external environment for heat dissipation.

2. Description of Related Art

With the rapid development of science and technologies, the use demands of electronic devices are also gradually increased in recent years. With the efficiency increment of the electronic devices, the heating power of electronic parts used inside the electronic devices are also constantly increased.

For example, for a gaming laptop with a high operational requirement, a high-efficient electronic part needs to be disposed in a light and thin space on the premise that the gaming laptop is designed to be light and thin and easy to carry, and how to own sufficient heat dissipation effect when a user performs high-operation processing on required game software becomes the design emphasis of the products.

SUMMARY OF THE INVENTION

The invention provides a portable electronic device including an electronic module disposed on a movable carrier and linked to a door, such that the electronic module is exposed to an external environment for heat dissipation when the door is opened relative to a body.

The portable electronic device of the invention includes a body, a door, a carrier and at least one electronic module. The door is movably mounted on the body. The carrier includes a first side and a second side opposite to each other, the first side is pivoted to the body, and the second side is movably pivoted to the door. The electronic module is disposed on the carrier. When the door moves away from the body, at least one opening is formed between the door and the body, and the door drives the carrier to rotate relative to the body, such that the electronic module is tilted with respect to the body along with the movement of the door, and the electronic module is exposed to an external environment via the opening for heat dissipation.

Based on the above, the first side of the carrier is pivoted to the body, the second side of the carrier is pivoted to the door, and therefore, when the door moves and is opened relative to the body, at least one opening is formed between the door and the body, and the electronic module disposed on the carrier is hence exposed to the external environment via the opening, thereby creating an environment for dissipating heat of the electronic module. That is, a probability that the electronic module exchanges heat with the external environment is increased, which facilitates the heat dissipation efficiency of the electronic module. Moreover, as the electronic module is tilted with respect to the body along with the movement of the carrier while the opening is formed that is, a gap between the body and the electronic module is enlarged in the tilted state, such that the heat dissipation efficiency of the electronic module is increased.

BRIEF DESCRIPTION OF THE DRAWINGS

FIG. 5A and FIG. 5B are partial side views of the portable electronic device in different states.

DESCRIPTION OF THE EMBODIMENTS

Figure 1:
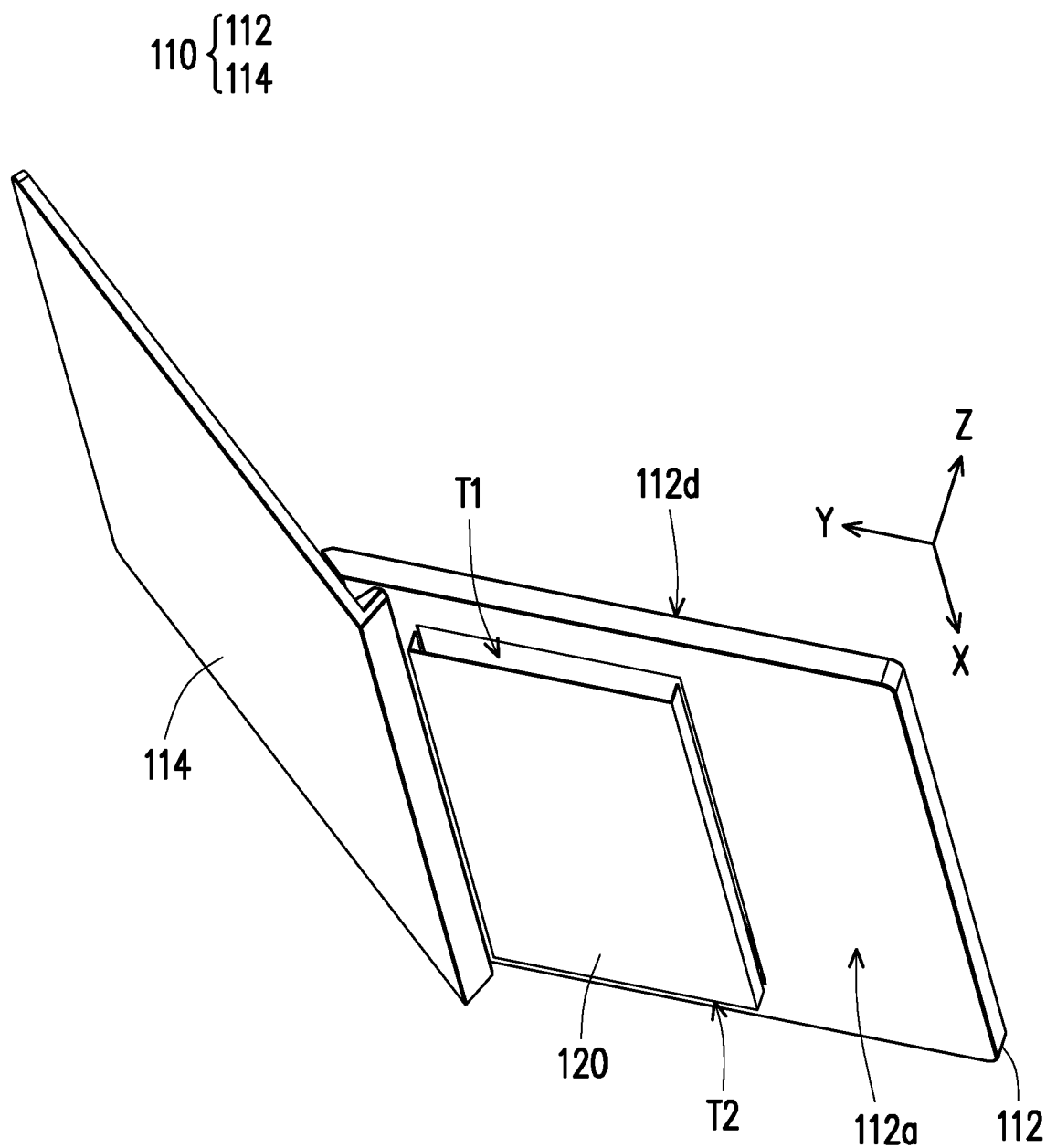
FIG. 1 is a schematic diagram of a portable electronic device according to an embodiment of the invention.
Figure 2:
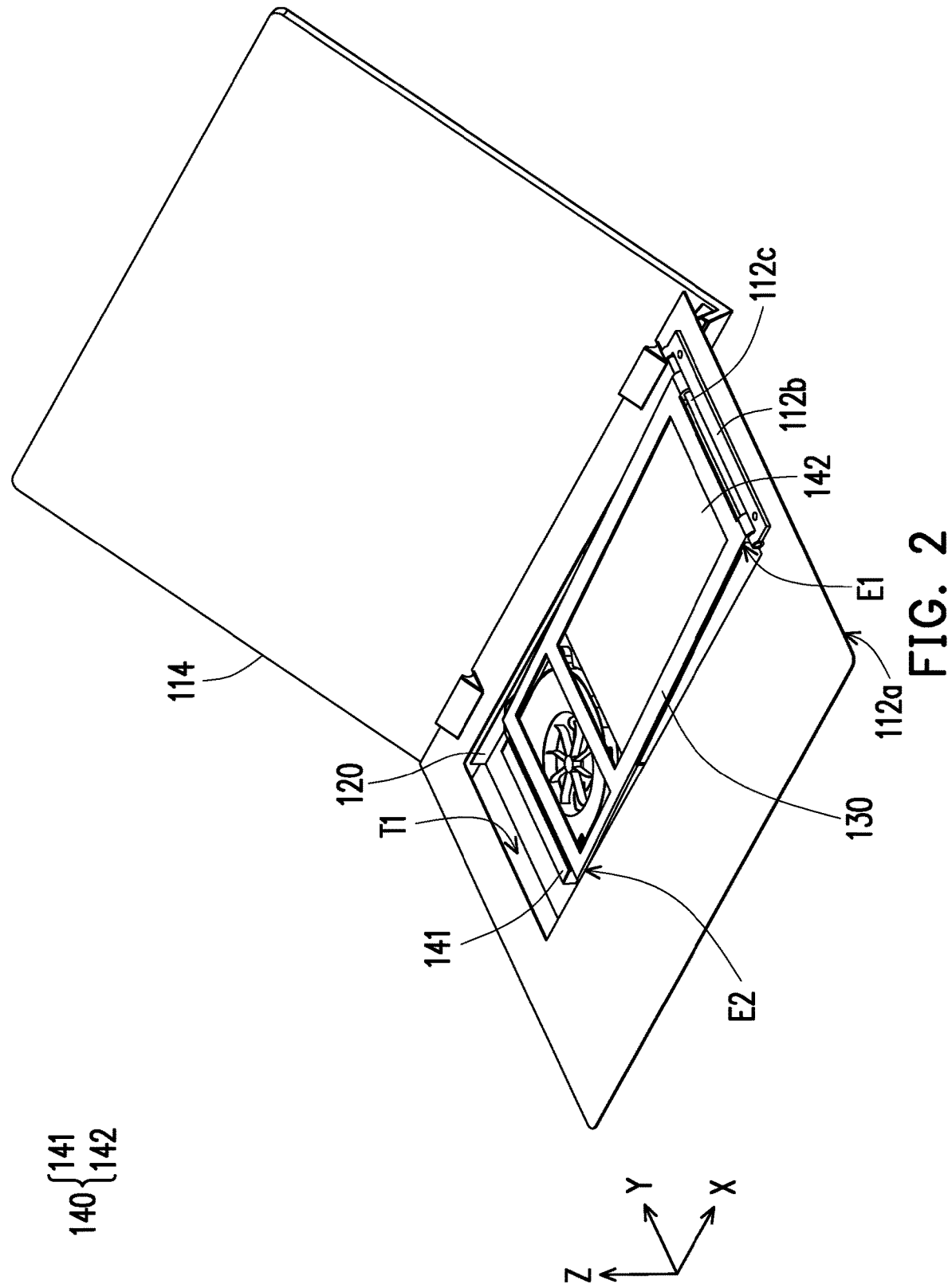
FIG. 2 shows a part of components of the portable electronic device in FIG. 1 from another view angle.
Figure 3:
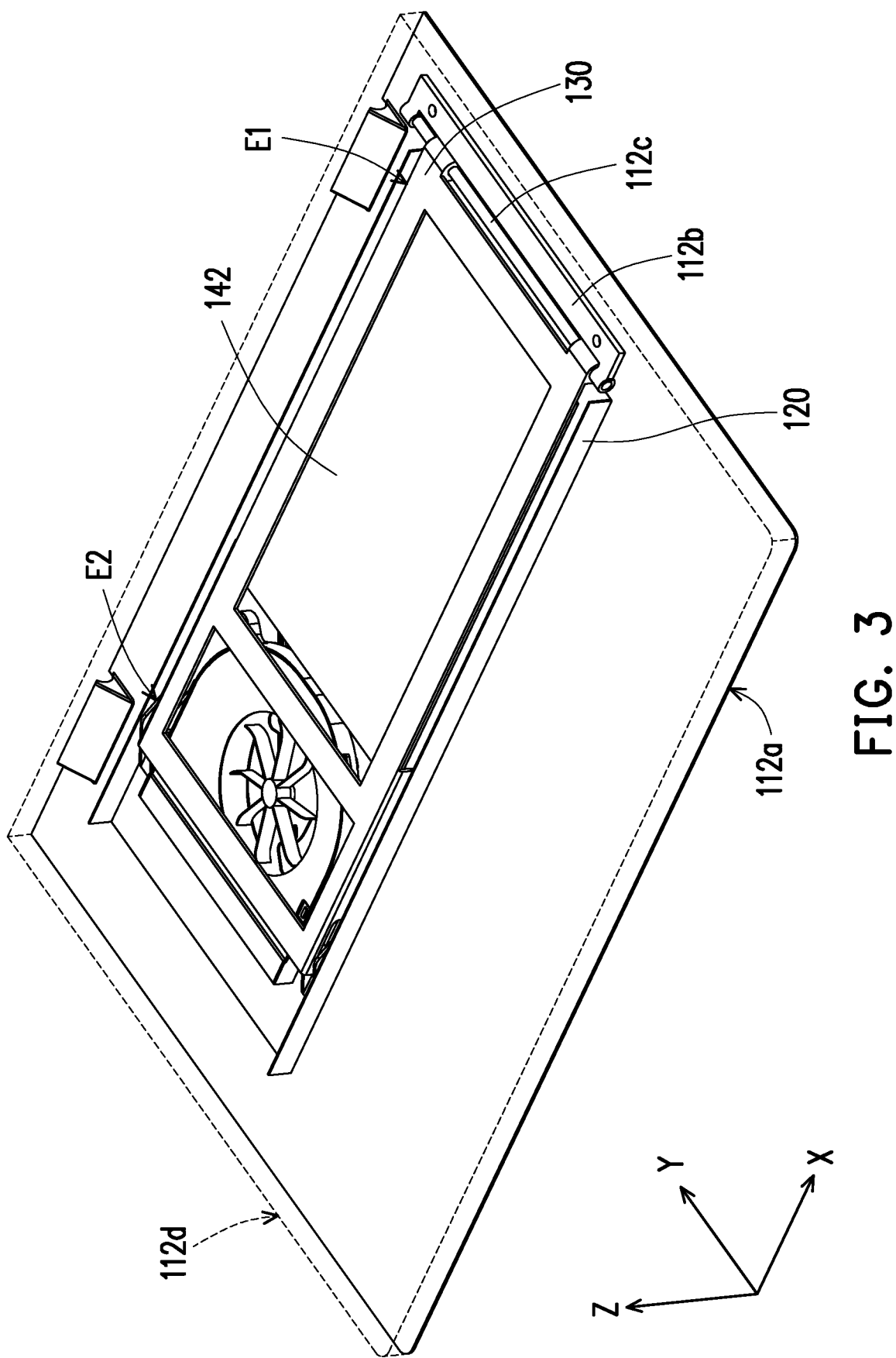
FIG. 3 is a schematic diagram of a part of components of the portable electronic device in another state.

FIG. 1 is a schematic diagram of a portable electronic device according to an embodiment of the invention. FIG. 2 shows a part of components of the portable electronic device in FIG. 1 from another view angle. FIG. 3 is a schematic diagram of a part of components of the portable electronic device in another state. A rectangular coordinate X-Y-Z is provided herein for the description of the components. Referring to FIG. 1 to FIG. 3 at the same time, in the present embodiment, a portable electronic device 100, for example a laptop, includes a body 110, a door 120, a carrier 130 and at least one electronic module 140. The door 120 is movably mounted on the body 110 along the Z axis. The carrier 130 includes a first side E1 and a second side E2 opposite to each other along the X axis, the first side E1 is pivoted to the body 110, and the second side E2 is movably pivoted to the door 120. The electronic module 140 is disposed on the carrier 130, at least one opening (openings T1 and T2 are taken as examples herein, but it is not limited thereto) is formed between the door 120 and the body 110 when the door 120 moves away from the body 110, and the door 120 drives the carrier 130 to rotate relative to the body 110 (along a Y axis), such that the electronic module 140 is tilted with respect to the body 110 along with the movement of the door 120, and the electronic module 140 is exposed to an external environment via the openings T1 and T2 for heat dissipation.

Further, the body 110 includes a host 112 and a display 114, and the above-mentioned components are mainly disposed in the host 112. The electronic module 140 of the present embodiment includes a cooling fan 141 and a circuit board 142 which are substantially mounted on the carrier 130 presented in a frame structure. The door 120 is enabled to move relative to the body 110 and the host 112 along the Z axis according to a corresponding connection relationship between the above-mentioned host 112, carrier 130 and door 120 so as to be switched between an open state (as shown in FIG. 3) and a closed state (as shown in FIG. 1 and FIG. 2). A form of the electronic module 140 is not limited herein and may vary with a form of the portable electronic device. In the present embodiment, the cooling fan 141 is disposed in a region A2 of the carrier 130, and the circuit board 142 is disposed in a region A1 of the carrier 130. When the door 120 is opened, the cooling fan 141 is adjacent to the opening T1, it is beneficial for absorbing cold air from the external environment and discharging the cold air towards the circuit board 142, such that the heat dissipation efficiency of the circuit board 142 (and an electronic chip thereon) is increased. Meanwhile, the circuit board 142 (and the electronic chip thereon) may also be exposed to the external environment via the openings T1 and T2, such that heat generated by the circuit board 142 may also be directly dissipated to the external environment, and therefore, a load of the cooling fan 141 may also be reduced at the same time.

When the door 120 moves relative to the host 112 of the body 110 and is closed, the door 120 has an appearance in consistency with a bottom surface 112a of the host 112 of the body 110, and the carrier 130 and the electronic module 140 are parallel to a plane (i.e., an X-Y plane) that the body (the host 112) is located and a plane (i.e., also the X-Y plane) that the door 120 is located. From this, it can be further known that the door 120 of the present embodiment moves relative to the body 110 (the host 112) in a mode of being parallel to the bottom surface 112a of the body 110 (the host 112).

Once the door 120 is opened relative to the host 112 of the body 110, the openings T1 and T2 are formed between the door 120 and the bottom surface 112a of the host 112, in this case, the carrier 130 is driven by the door 120 and is in a tilted state as shown in FIG. 2 due to a connection relationship between the two opposite sides (the first side E1 and the second side E2) and the host 112 and between the two opposite sides (the first side E1 and the second side E2) and the door 120, respectively, such that the electronic module 140 may be exposed to the external environment via the opening T1 and T2, and furthermore, a beneficial heat dissipation condition may be provided to the electronic module 140. In other words, compared with the closed state as shown in FIG. 3, when the portable electronic device 100 needs to further dissipate the heat from a heat source, e.g., (the circuit board 142 and the electronic chip thereon (not shown) therein, the door 120 may be driven to be opened relative to the bottom surface 112a of the host 112, such that the electronic module 140 is exposed to the external environment, which is favorable for heat dissipation.

Figure 4:
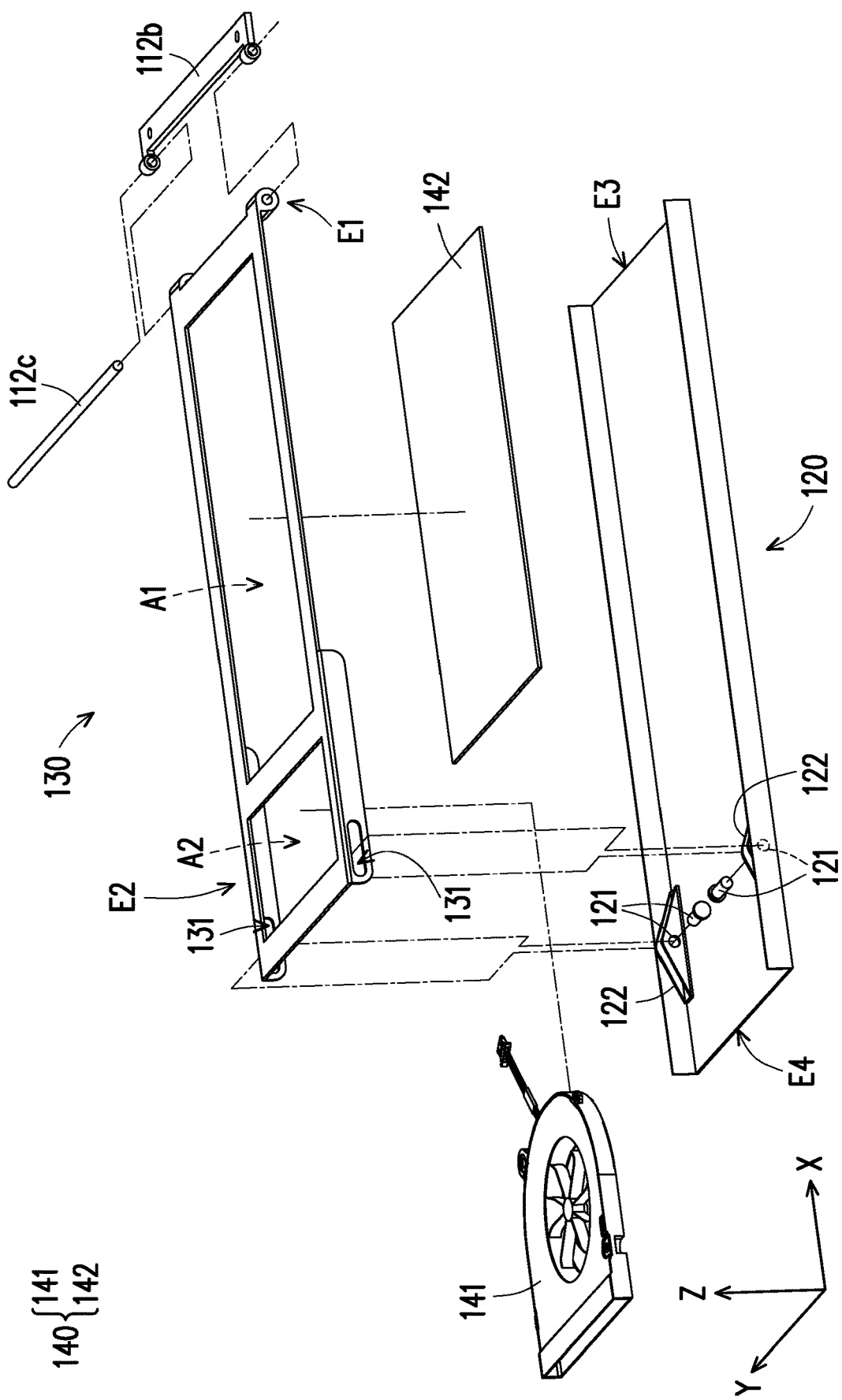
FIG. 4 is an explosive view of the part of components of the portable electronic device in FIG. 3.

FIG. 4 is an explosive view of the part of components of the portable electronic device in FIG. 3. Referring to FIG. 2 to FIG. 4 at the same time, in the present embodiment, a support frame 112b and a pivot 112c are disposed inside the host 112, and the first side E1 of the carrier 130 is pivoted to the support frame 112b via the pivot 112c, such that the first side E1 rotates about the Y axis. Moreover, the carrier 130 further includes a track 131 located at the second side E2, and an extension direction of the track 131 is the same as a direction (from the first side E1 to the second side E2, or from the second side E2 to the first side E1) in which the first side E1 and the second side E2 are opposite to each other, the track 131 is coupled to a connecting base 122 on the door 120 via a pivot 121, and the pivot 121 is also enabled to move along the track 131 for the carrier 130 and the door 120 to be in a state of pivoting relative to each other and sliding relative to each other at the second side E2.

Moreover, as shown in FIG. 4, the door 120 has a third side E3 and a fourth side E4 opposite to each other, and therefore, when the door 120 is opened relative to the host 112 of the body 110, the third side E3 and the fourth side E4 may respectively correspond to the first side E1 and the second side E2 to respectively form the openings T1 and T2 between the door 120 and the host 112.

FIG. 5A and FIG. 5B are partial side views of the portable electronic device in different states. Referring to FIG. 4, FIG. 5A and FIG. 5B, as the foregoing carrier 130 is of the frame structure, for the electronic module 140 disposed thereon, a gap may exist between a periphery of the electronic module 140 and the host 112 of the body 110. That is, as shown in FIG. 5A and FIG. 5B, the electronic module 140 is mounted on the frame structure and keeps gaps respectively from a top surface 112d and the bottom surface 112a of the body 110 (the host 112). Even if the door 120 is opened relative to the host 112, the carrier 130 and the electronic module 140 thereon are tilted and also keep the gaps respectively from the top surface 112d and the bottom surface 112a of the host 112, which facilitates the heat dissipation efficiency.

Figure 6:
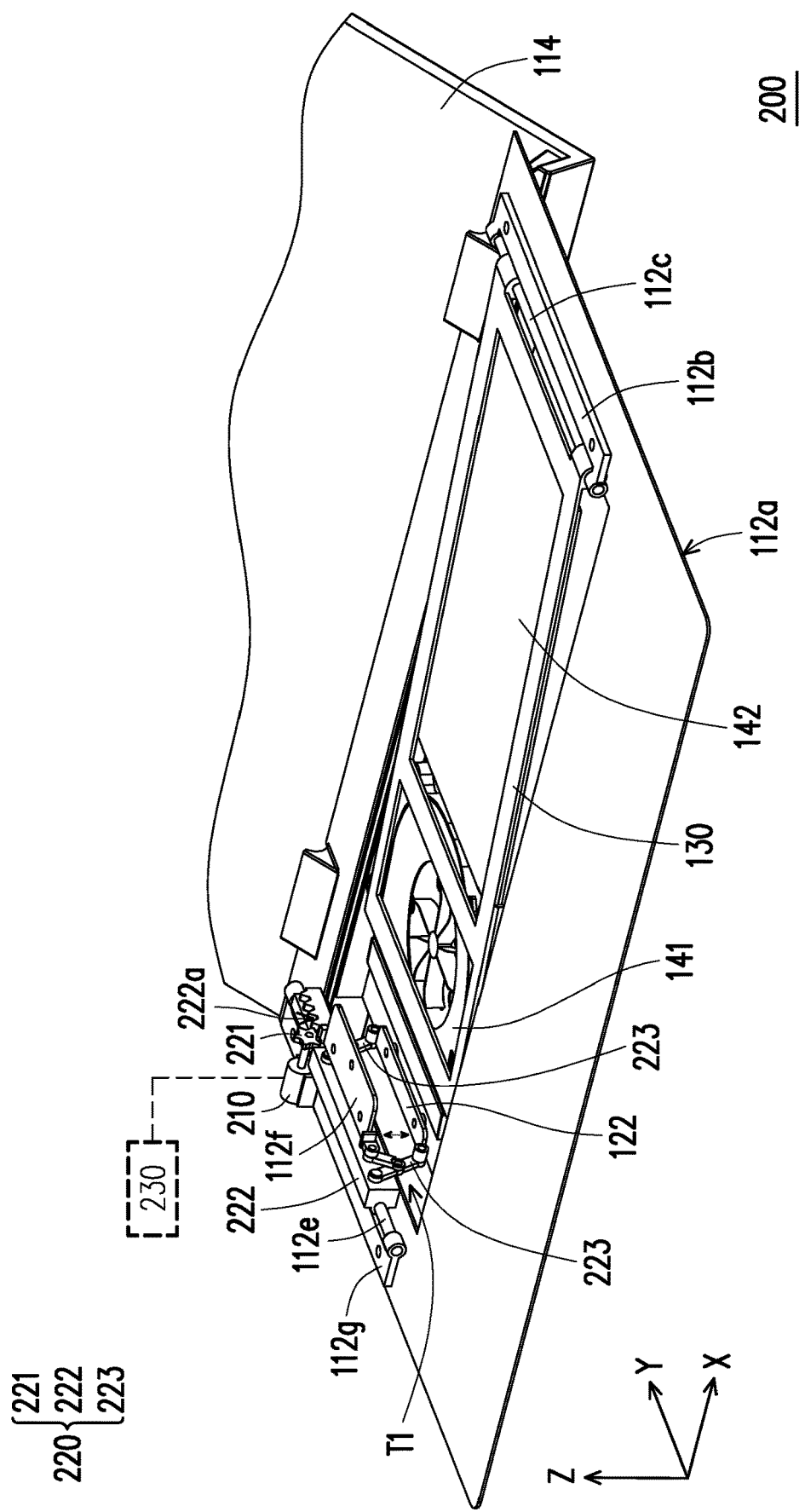
FIG. 6 is a partial schematic diagram of a portable electronic device according to another embodiment of the invention.

FIG. 6 is a partial schematic diagram of a portable electronic device according to another embodiment of the invention. Referring to FIG. 6, a portable electronic device 200 of the present embodiment also includes components the same as the above-mentioned components, which are labeled herein with the same symbols and are not described again. Different from the above-mentioned embodiment, the portable electronic device 200 further includes a power source 210 and a driving component 220. The power source 210 is, for example, a motor, and is disposed in the host 112. The driving component 220 is connected to the host 112 of the body 110, the power source 210 and the door 120. Herein, the power source 210 drives the door 120 to move relative to the host 112 of the body 110 via the driving component 220, so as to achieve the effect of the above-mentioned component effect.

In detail, the driving component 220 includes a gear 221, a slide block 222 and a linkage 223 The gear 221 is disposed on a driving shaft of the motor, and the host 112 further has support frames 112g and 112f and a guide rod 112e arranged therein. The slide block 222 is movably coupled to the guide rod 112e, the support frame 112g is substantially disposed at an inner side of the bottom surface 112a of the host 112, the support frame 112f is substantially disposed at an inner side of the top surface 112d of the host 112, and the slide block 222 further has a rack structure 222a to be coupled to the gear 221. The linkage 223 is connected (pivoted) to the support frames 112g and 112f of the host 112 and the support frame 112 on the door 120, respectively. Thereby, the power source 210 may drive the slide block 222 to move along the guide rod 112e via the gear 221 and the rack structure 222a in sequence for the slide block 222 to drive the door 120 to move relative to the host 112 via the linkage 223, such that the same movement effect as that in the above-mentioned embodiment is achieved.

In addition, the portable electronic device 200 further includes a control module 230 electrically connected to the power source 210 and configured to drive the power source 210 according to an open/closed state of the body 110. For example, as shown in the present embodiment and the above-mentioned embodiment illustrated in FIG. 1, when the portable electronic device 110 or 200 is in use, the display 114 of the body 110 is substantially expanded relative to the host 112, such that the host 112 is lifted by a side edge of the display 114 to form a space on a bottom surface 112a thereof, and the space may allow the door 120 to be opened relative to the host 112. In other words, the control module 230 may determine the open/closed state of the body 110 via a sensing component (not shown), and once the open state as shown in FIG. 1 or of the present embodiment is formed, the control module 230 may drive the power source 210 to further drive the door 120 to be opened relative to the host 112, such that the electronic module 140 on the carrier 130 is exposed to the external environment, which is beneficial to heat dissipation.

Based on the above, in the above-mentioned embodiments of the invention, the first side of the carrier is pivoted to the body, the second side of the carrier is pivoted to the door, and therefore, when the door moves and is opened relative to the body, at least one opening is formed between the door and the body, and the electronic module disposed on the carrier is hence exposed to the external environment via the opening, thereby creating an environment for dissipating heat of the electronic module. That is, the probability that the electronic module exchanges heat with the external environment is increased, which facilitates the heat dissipation efficiency of the electronic module. Moreover, as the electronic module is tilted with respect to the body along with the movement of the carrier while the opening is formed. That is, the gap between the body and the electronic module is enlarged in the tilted state, such that the heat dissipation efficiency of the electronic module is increased.

What is claimed is:

1. A portable electronic device, comprising:
   a body;
   a door, movably mounted on the body;
   a carrier, comprising a first side and a second side opposite to each other, the first side being pivoted to the body, and the second side being movably pivoted to the door; and
   at least one electronic module, disposed on the carrier, wherein when the door moves away from the body, at least one opening is formed between the door and the body, and the door drives the carrier to rotate relative to the body, such that the electronic module is tilted with respect to the body along with the movement of the door, and the electronic module is exposed to an external environment via the opening for heat dissipation.

2. The portable electronic device according to claim 1, wherein the carrier comprises a track located at the second side, and the door is movably coupled to the track via a pivot.

3. The portable electronic device according to claim 2, wherein an extension direction of the track is the same as a direction in which the first side and the second side are opposite to each other.

4. The portable electronic device according to claim 1, wherein the electronic module comprises at least one of a cooling fan and a circuit board.

5. The portable electronic device according to claim 1, wherein the carrier is a frame structure, and the electronic module is mounted on the frame structure and keeps gaps respectively from a top surface and a bottom surface of the body.

6. The portable electronic device according to claim 1, wherein when the door moves relative to the body and is closed, the door comprises a surface consistent with a bottom surface of the body, and the carrier and the electronic module are parallel to a plane that the body is located and a plane that the door is located.

7. The portable electronic device according to claim 1, wherein the door moves relative to the body in a mode of being parallel to a bottom surface of the body.

8. The portable electronic device according to claim 1, wherein a pair of openings are formed between the door and the body when the door moves away from the body, which respectively correspond to the first side and the second side.

9. The portable electronic device according to claim 1, further comprising:
   a power source, disposed on the body; and
   a driving component, connected to the body, the power source and the door, and the power source driving the door to move relative to the body via the driving component.

10. The portable electronic device according to claim 9, wherein the driving component comprises:
    a slide block, movably disposed on the body; and
    a linkage, connected to the slide block, the body and the door, the power source driving the slide block to move in the body to drive the door to move relative to the body via the linkage.

11. The portable electronic device according to claim 10, wherein a moving axial direction of the slide block is orthogonal to that of the door.

12. The portable electronic device according to claim 10, wherein the power source is a motor, and the driving component further comprises:
    a gear, disposed on a driving shaft of the motor, the slide block further comprising a rack structure coupled to the gear, and the motor driving the slide block via the gear and the rack structure.

13. The portable electronic device according to claim 9, further comprising a control module, electrically connected to the power source, wherein the control module drives the power source according to an open/closed state of the body.

* * * * *